(12) United States Patent
Kochan, II et al.

(10) Patent No.: US 12,154,069 B2
(45) Date of Patent: Nov. 26, 2024

(54) SYSTEM AND METHODS FOR MODULAR INVENTORY MANAGEMENT

(71) Applicant: PAR Excellence Systems, Inc., Cincinnati, OH (US)

(72) Inventors: Thomas Joseph Kochan, II, Brighton, MI (US); Stanley Scott Copeland, Gahanna, OH (US); Thaddeus E. MacKrell, Grosse Pointe City, MI (US); Simon Luc Leclerc, Cincinnati, OH (US); Brandon Michael Lee Scheyer, Cincinnati, OH (US); David Andrew Parrott, Cincinnati, OH (US); Benjamin Thomas Krupp, Wyoming, OH (US)

(73) Assignee: PAR Excellence Systems, Inc., Cincinnati, OH (US)

( * ) Notice: Subject to any disclaimer, the term of this patent is extended or adjusted under 35 U.S.C. 154(b) by 269 days.

(21) Appl. No.: 17/629,896

(22) PCT Filed: Jul. 28, 2020

(86) PCT No.: PCT/US2020/043887
§ 371 (c)(1),
(2) Date: Jan. 25, 2022

(87) PCT Pub. No.: WO2021/021815
PCT Pub. Date: Feb. 4, 2021

(65) Prior Publication Data
US 2022/0253796 A1    Aug. 11, 2022

Related U.S. Application Data

(60) Provisional application No. 62/879,488, filed on Jul. 28, 2019.

(51) Int. Cl.
*G06Q 10/087* (2023.01)
*B65G 1/04* (2006.01)
*B65G 1/137* (2006.01)

(52) U.S. Cl.
CPC ......... *G06Q 10/087* (2013.01); *B65G 1/0442* (2013.01); *B65G 1/137* (2013.01); *B65G 2203/0258* (2013.01)

(58) Field of Classification Search
CPC .................................................... G06Q 10/087
See application file for complete search history.

(56) References Cited

U.S. PATENT DOCUMENTS 5,487,603 A * 1/1996 Hoff ...................... B01F 35/881
                                                             700/285
6,576,849 B2   6/2003 Bliss et al.
(Continued)

OTHER PUBLICATIONS

Nagaria, Bandhan, Parv Shroff, and Rajat Mehrotra. "IoT Based Inventory System for Stock Management." Int. Res. J. Eng. Technol 6.4 (2019): 4094-4097. (Year: 2019).*

*Primary Examiner* — Nathan A Mitchell
(74) *Attorney, Agent, or Firm* — Frost Brown Todd LLP; Vance V. VanDrake, III; Alexander J. Johnson

(57) ABSTRACT

A modular inventory management system is included. The modular inventory monitoring system may include a receiver, a carrier, buses coupled to the carrier, and load cells coupled to the carrier. One or more of the load cells is configured to support a bin, and wherein the load cells are configured to continuously measure a weight of the bin and communicate the weight or a change in the weight to the receiver. A method of using a modular inventory management system is also included.

19 Claims, 12 Drawing Sheets

(56) References Cited

U.S. PATENT DOCUMENTS

| | | | |
|---|---|---|---|
| 9,557,209 B2* | 1/2017 | Savage | B65D 7/24 |
| 10,466,095 B1* | 11/2019 | O'Neill | G01G 19/42 |
| 10,732,026 B1* | 8/2020 | Danenberg | H05K 5/0073 |
| 10,809,122 B1* | 10/2020 | Danenberg | A47F 5/103 |
| 11,468,400 B1* | 10/2022 | Kumar | G01G 19/387 |
| 11,927,472 B1* | 3/2024 | DesJardien | G06Q 30/0283 |
| 2006/0190130 A1 | 8/2006 | Fedor et al. | |
| 2006/0231296 A1* | 10/2006 | Knudsen | G01G 3/12 |
| | | | 177/132 |
| 2008/0183599 A1 | 7/2008 | Hill et al. | |
| 2009/0222359 A1* | 9/2009 | Henry | G06Q 50/04 |
| | | | 705/28 |
| 2011/0139871 A1 | 6/2011 | Yturralde et al. | |
| 2011/0153466 A1* | 6/2011 | Harish | G06Q 10/087 |
| | | | 705/28 |
| 2015/0088306 A1* | 3/2015 | Varrasso | G07F 9/001 |
| | | | 221/150 R |
| 2015/0366377 A1* | 12/2015 | Savage | H02G 1/00 |
| | | | 312/270.3 |
| 2016/0196454 A1* | 7/2016 | Soffer | H01R 13/665 |
| | | | 726/16 |
| 2016/0283898 A1* | 9/2016 | Reuther | G06Q 10/087 |
| 2016/0304280 A1 | 10/2016 | Elazary et al. | |
| 2017/0217011 A1 | 8/2017 | Savage et al. | |
| 2019/0231467 A1* | 8/2019 | Grimsley | A61B 17/06133 |
| 2021/0148750 A1* | 5/2021 | Trakhimovich | G06Q 10/087 |
| 2022/0104636 A1* | 4/2022 | Chila | G16H 40/40 |

* cited by examiner

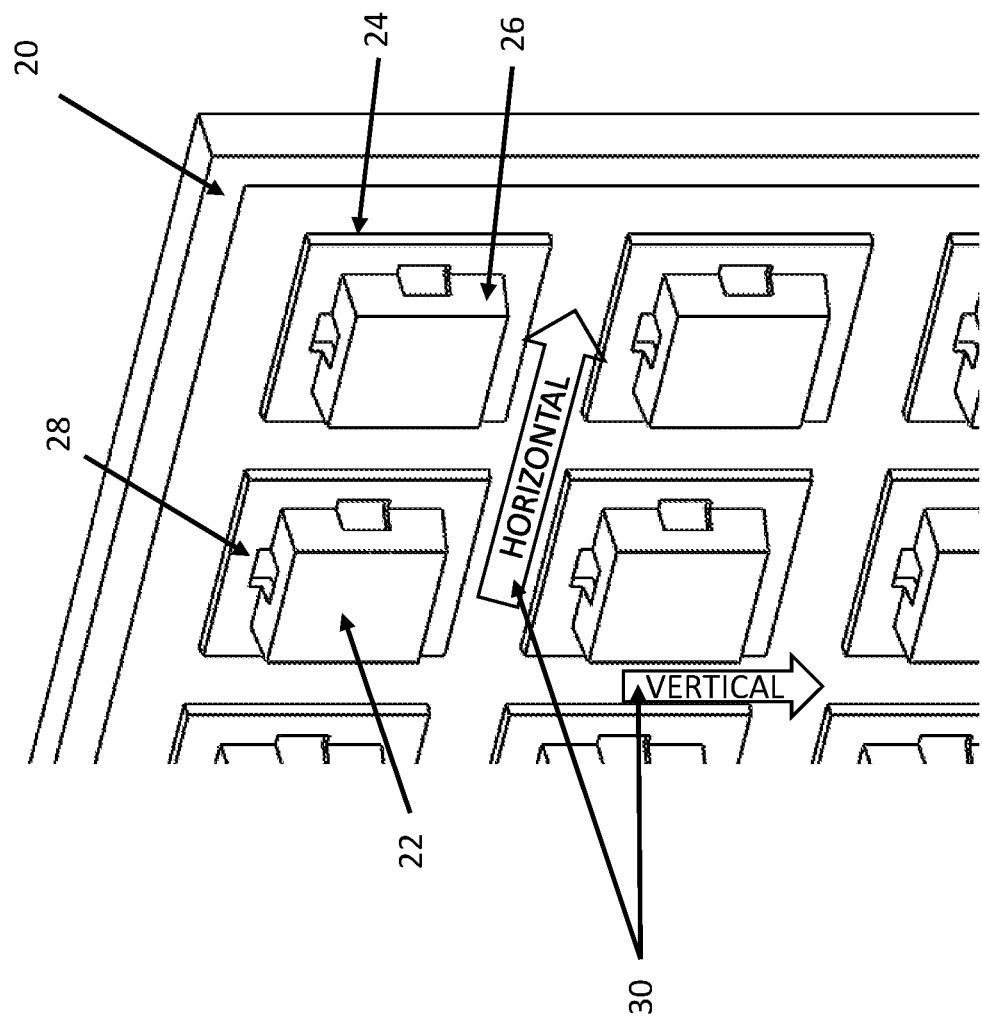

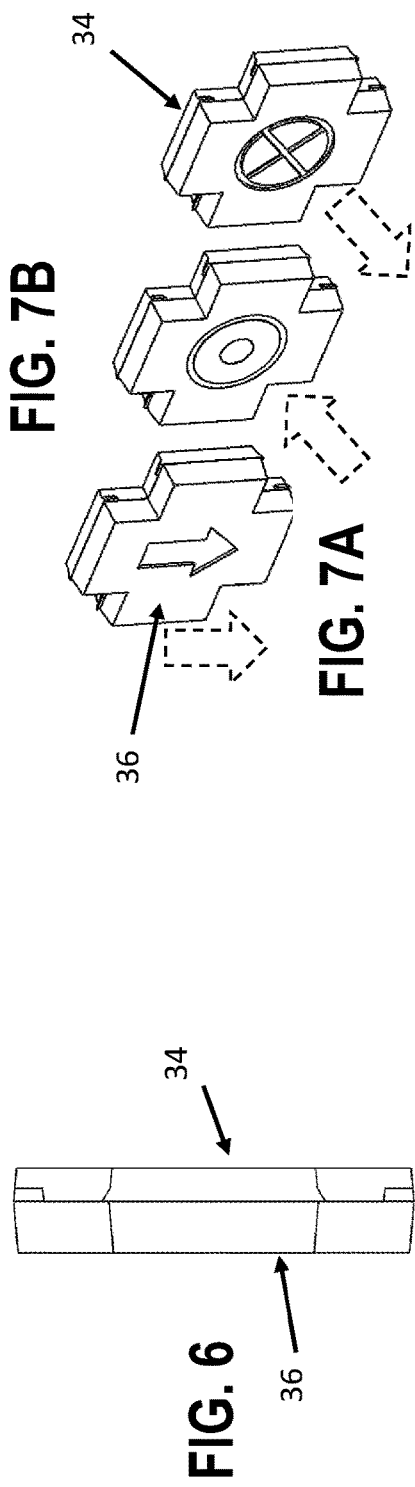
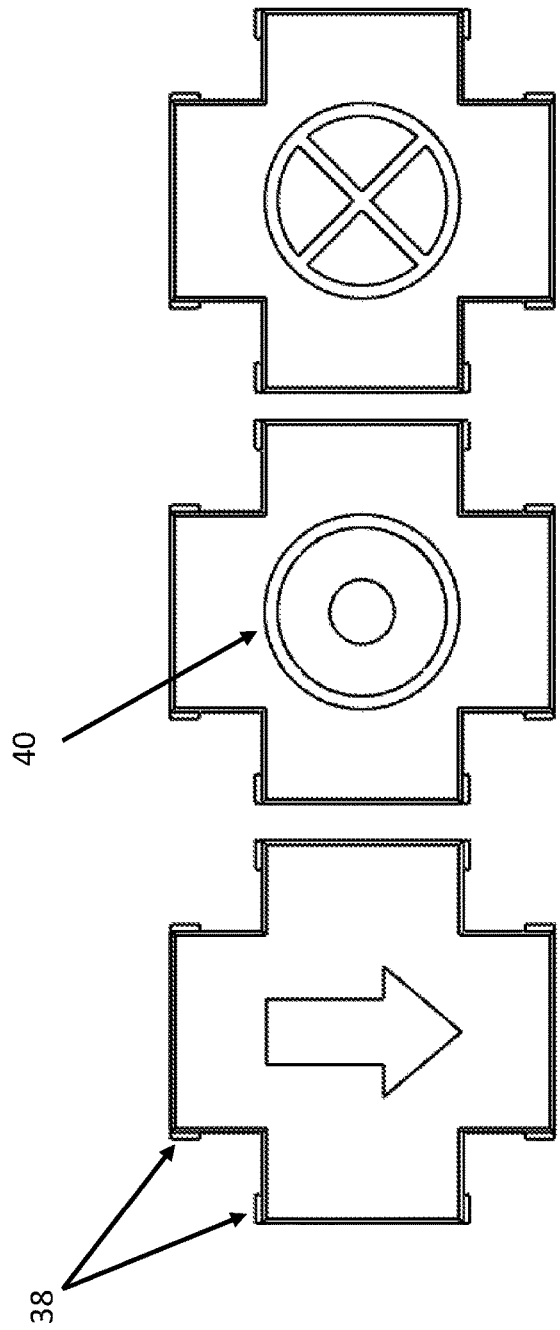

Gravity vector

SYSTEM AND METHODS FOR MODULAR INVENTORY MANAGEMENT

CROSS-REFERENCE TO RELATED APPLICATIONS

The present application is a national stage application under 35 U.S.C. § 371 of International Application No. PCT/US2020/043887, filed Jul. 28, 2020, which claims the priority of U.S. Provisional Patent Application Ser. No. 62/879,488, filed Jul. 28, 2019, and hereby incorporates the same applications herein by reference in their entireties.

TECHNICAL FIELD

Embodiments of the technology relate, in general, to methods and systems for monitoring inventory management and, more particularly, to modular inventory management.

BACKGROUND

There exists a need for a system which efficiently stores and monitors inventories of supplies, such as medical supplies, both in a central storage area and in areas with more specific applications, such as an operating room.

SUMMARY

An embodiment includes a modular inventory management system or device.

An embodiment includes a method of using a monitoring and managing inventory using a modular inventory management system or device.

BRIEF DESCRIPTION OF THE DRAWINGS

The present disclosure will be more readily understood from a detailed description of some example embodiments taken in conjunction with the following figures:

FIG. 3 is a partial view of the carrier of the storage system of FIG. 1.

FIG. 6 is a side view of the load cell of the storage system of FIG. 1.

FIGS. 7A-7C are perspective views of exemplary force configurations of load cells in accordance with various embodiments of the present invention.

FIG. 8A-8C are elevation views of the load cells of FIG. 7.

DETAILED DESCRIPTION

Figure 1:
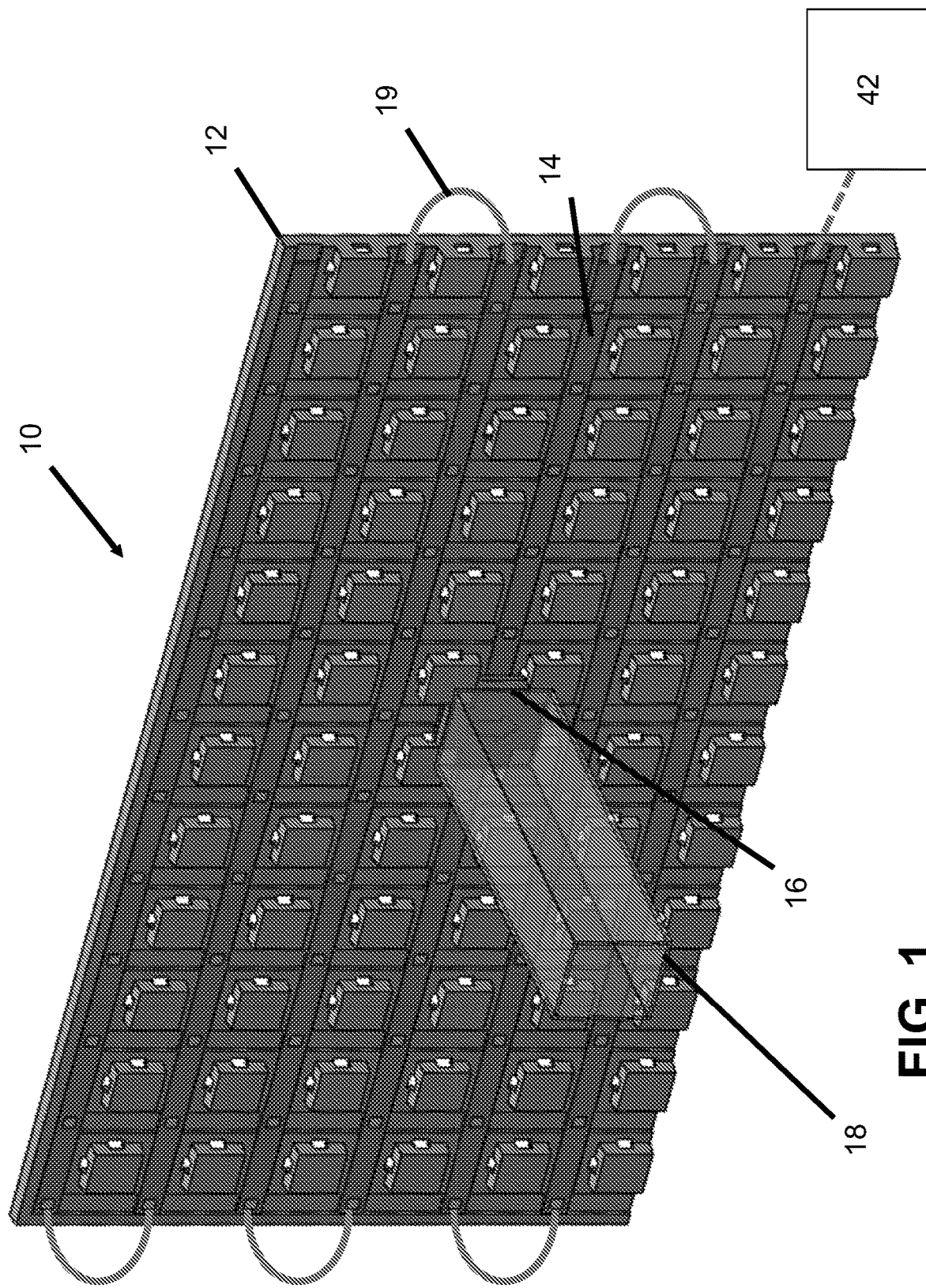
FIG. 1 is a perspective view of an exemplary storage system in accordance with an embodiment of the present invention.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of apparatuses, systems, and methods for modular management and monitoring of inventory. In one example embodiment, a storage system includes a carrier, one or more buses and one or more load cells coupled to the carrier, and one or more bins coupled to the load cells. Example embodiments described herein may be used to efficiently store and continuously monitor inventories of supplies, such as sutures, in a suitable location, such as in a hospital or surgery center, and more particularly within a central operating room storage area, an individual operating room for a selected type of surgery, emergency department, or other area of the facility. As described in greater detail below, each of the bins is supported by a respective load cell configured to continuously measure the weight of the corresponding bin and its contents and communicate the detected weight to a receiver. The detected weight may be used by the receiver to continuously monitor an inventory of the bins so that the inventories may be appropriately replenished. In this manner, the storage system may provide improved cost management by reducing overstocked or slow-moving inventory, and may also provide improved utilization of valuable space in the operating room core inventory areas and timely replenishment of consumed inventory to eliminate stock-outs and delays in surgical procedures resulting from lack of necessary inventory.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Figure 2:
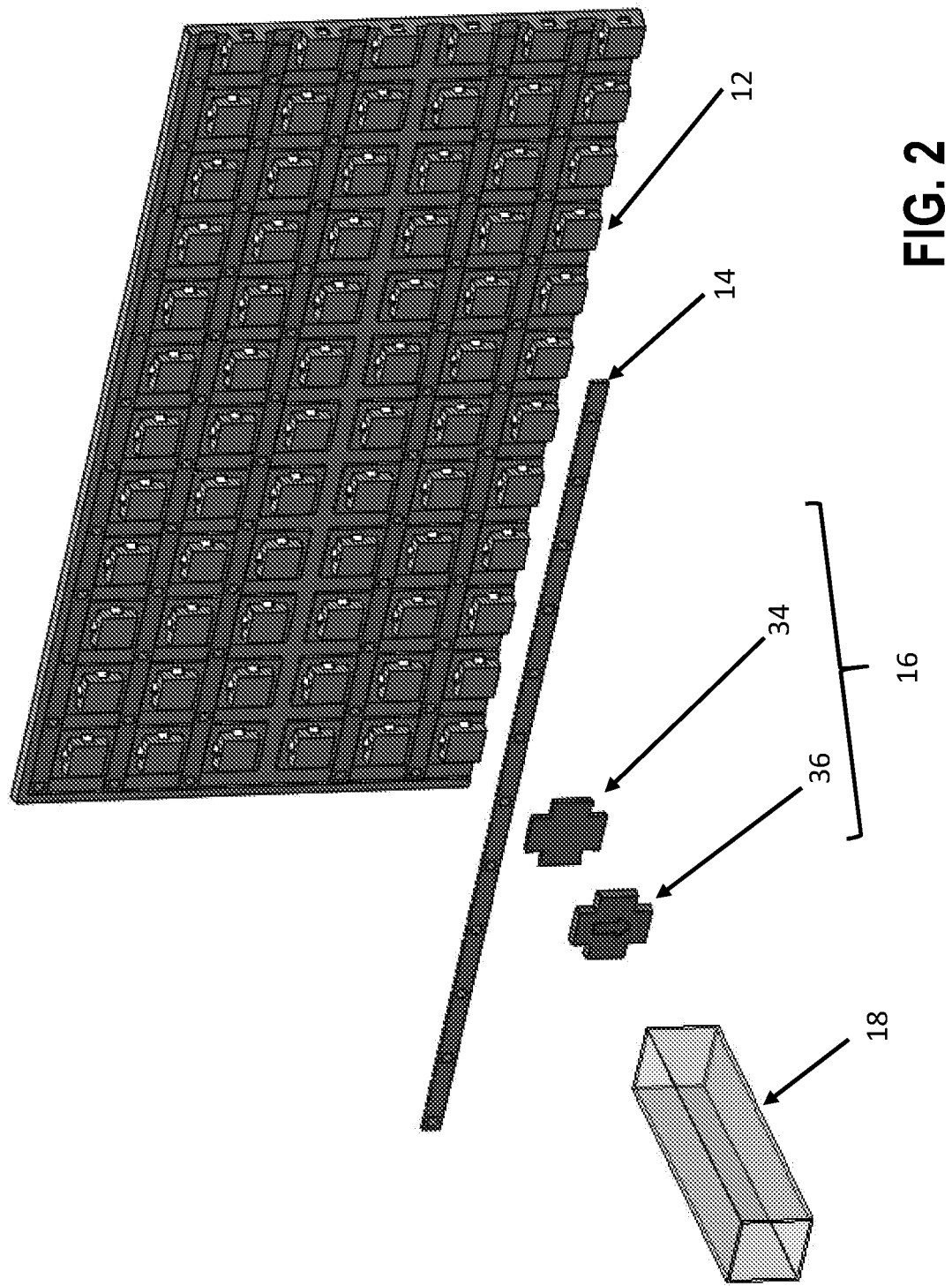
FIG. 2 is an exploded view of the storage system of FIG. 1.
Figure 4B:
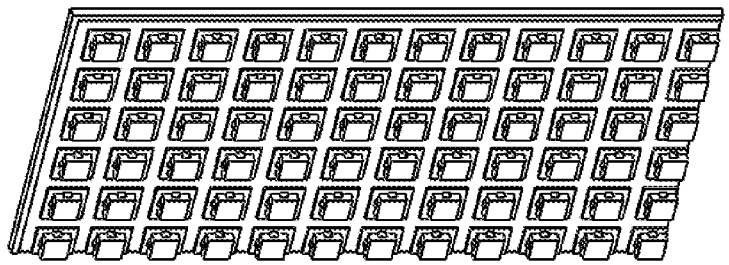
FIGS. 4A and 4B are perspective views of alternative configurations of the carrier of FIG. 1.
Figure 4A:
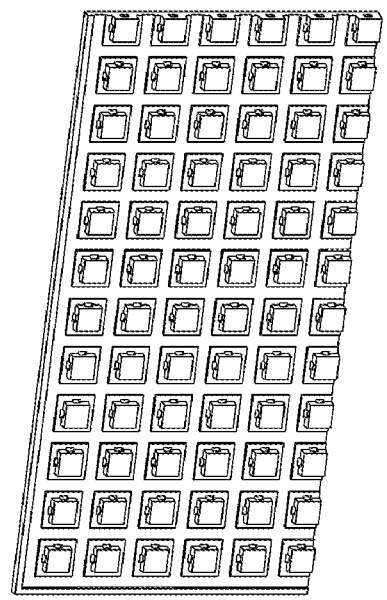

With reference to FIGS. 1 and 2, an exemplary storage system 10 is illustrated according to one embodiment of the present invention. The storage system 10 may be used to efficiently store and continuously monitor inventories of supplies, such as sutures, in a suitable location, such as in a hospital or surgery center. More particularly, the storage system 10 may be used within a central operating room storage area, an individual operating room for a selected type of surgery, emergency department, or other area of the facility. As shown, the storage system 10 includes a carrier 12 that supports one or more buses 14, one or more load cells 16, and one or more bins 18. The buses 14 are electrically coupled, for example, by jumpers 19. The bins 18 define an opening into which supplies may be inserted and removed. Depending on the orientation of the bin 18, the location of the opening may vary.

Referring to FIGS. 1-4B, in an embodiment, the carrier 12 includes a support surface 20 and at least one stanchion 22 integrally coupled to the support surface 20. The carrier 12 may be, for example, stamped, injection molded, thermoformed, cast, rotationally molded, etc. Each stanchion 22 includes a base 24, a raised portion 26 extending from the base 24, and one or more apertures 28. The apertures 28 extend through a portion of the base 24 and of the raised portion 26. Each stanchion 22 may include four apertures 28, although the number and configuration may vary. The stanchions 22 are spaced apart such that a load cell 16 can fit between the stanchions 22. The stanchions 22 may be arranged in a grid-like pattern. The number and configuration of the stanchions 22 may vary. For example, in FIGS. 4A and 4B, an example carrier 12 includes 72 stanchions 22 arranged in a grid of 6 rows and 12 columns or, alternatively, 12 rows and 6 columns, respectively. Between the stanchions 22 are tracks or channels 30 each configured to receive a bus 14.

Figure 5:
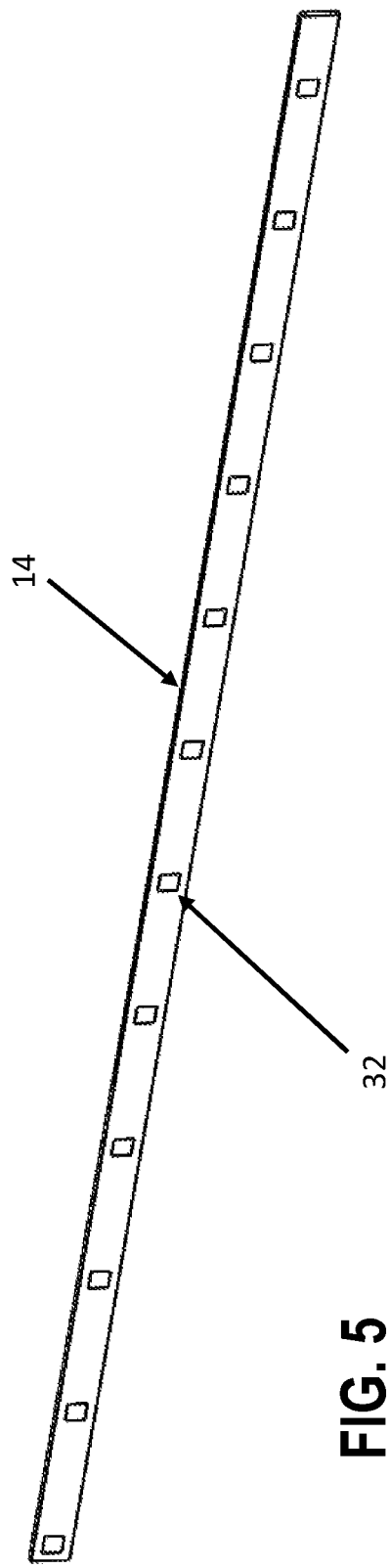
FIG. 5 is a perspective view of the bus of the storage system of FIG. 1.

Now referring to FIGS. 2 and 5, according to an embodiment, the printed circuit board contains and routes the bus 14 wires, which are comprised of power (+ and −) and communication (transmit and receive) and one or more connectors 32. The bus 14 is coupled to the carrier 14 via mechanical means, for example, such as adhesive, tape, or mechanical fasteners, such as rivets, screws, bolts, snaps, etc., or a combination thereof. In the example carrier 12 shown in FIG. 1, the buses 14 may be arranged horizontally, vertically, or a combination thereof in the channels 30.

With reference to FIGS. 2 and 6-8C, the load cell 16 is a transducer, each of which includes a chassis 34 rigidly coupled to a platen 36. In turn, the chassis 34 is coupled to the carrier 12 between one or around one or more stanchions 22. In FIG. 1-3, each of the load cells 16 also include lugs 38, which provide mechanical latching to the carrier 12 via the aperture 28 (FIG. 3). Each load cell 16 is configured to fit between the stanchions 22. In the example shown in FIG. 2, the load cells 16 are cross-shaped. The load cells 16 may be coupled to the carrier 12 via the cooperation of the lugs 38 and the apertures 28. The orientation of the load cells 16 may vary. For example, if the carrier 12 is hanging on a vertical wall, gravity (arrows in FIGS. 7A-7C) will act on the load in a cantilevered manner. If the carrier is horizontal and the bins 18 extend downwardly from the carrier 12, gravity will cause tension in the load cell 16. If the carrier is horizontal and the bins 18 extend upwardly from the carrier 12, gravity will cause compression in the load cell 16. Referring to FIGS. 8A-8C, in an embodiment, each load cell 16 may include a load icon 40 indicating which type of force the load cell 16 is configured to analyze. For example, as shown in FIG. 8A, the load icon 40 for a load cell 16 configured to undergo a cantilevered force may be an arrow. As another example, as shown in FIG. 8B, the load icon 40 of a load cell 16 configured to undergo compression may be an annulus (e.g., a donut shape). As another example, as shown in FIG. 8C, the load icon 40 of a load cell 16 configured to undergo compression may be a circle with an X in the middle. Those skilled in the art will understand that the load icon 40 may vary in shape or color.

The load cells 16 are configured to be coupled to a corresponding bin 18. In an embodiment, the bin 18 may be coupled to the chassis 34 of the load cell 16. As discussed further below, a single bin 18 may be coupled to more than one load cell 16 (e.g., more than one chassis 34). The load cell 16 is configured to continuously measure the weight of the corresponding bin 18 and its contents and communicate the detected weight electronically via one or more signals to a receiver 42 (FIG. 1). The output of the load cell 16 may be amplified with a differential instrument amplifier and digitized by a precision bit analog to digital convertor (ADC), for example. The output of the ADC may be a serial data stream which may be transmitted to the receiver 42 for processing, such as via a serial communications network (not shown). Alternatively, the serial communications network may be facilitated by a wireless connection, for example. Changes in the detected weight may be used by the receiver 42 to continuously monitor an inventory of the bin 18 so that the inventories of the sutures may be appropriately replenished. As discussed above, the storage system 10 may provide improved cost management by reducing overstocked or slow-moving inventory and may also provide improved utilization of valuable space in the operating room core inventory areas and timely replenishment of consumed inventory to eliminate stock-outs and delays in surgical procedures resulting from lack of necessary inventory.

In one embodiment, each of the load cells 16 is calibrated to account for the removal of a supply, such as individually wrapped sutures. For example, when one or more individual sutures are removed from the corresponding bin 18, the load cell 16 may be configured to identify a change in weight of the corresponding bin 18. The change in weight may be communicated to the receiver 42, and the receiver 42 may infer that one or more sutures have been removed from the bin 18 based on the change in weight. For example, a decrease in the weight measured by the load cell 16 by one unit weight may indicate that one individual suture has been removed from the bin 18, while a decrease in the weight measured by the load cell 16 by two unit weights may indicate that two individual sutures have been removed from the bin 18.

In one embodiment, the receiver 42 may continuously display the current inventory quantity at a monitoring station, for example. In addition or alternatively, when a predetermined target weight of the bin 18 is reached, the receiver 42 may display a message at the monitoring station to signal that the inventory of the bin 18 should be replenished. The monitoring station may be on site or physically remote from the location of the storage system 10. In one embodiment, the monitoring station may be incorporated into a comprehensive inventory management system, such as that which is commercially available under the trademark PAR Excellence.

In one embodiment, the receiver 42 may collect and store data relating to the inventory condition of the bins 18. The inventory condition may be determined based on a preloaded program that sets the maximum weight of the corresponding bins 18 less the tare weight of bin 18 itself in order to accurately determine the inventory condition in response to the weight detected by the respective load cell 16.

Figure 9:
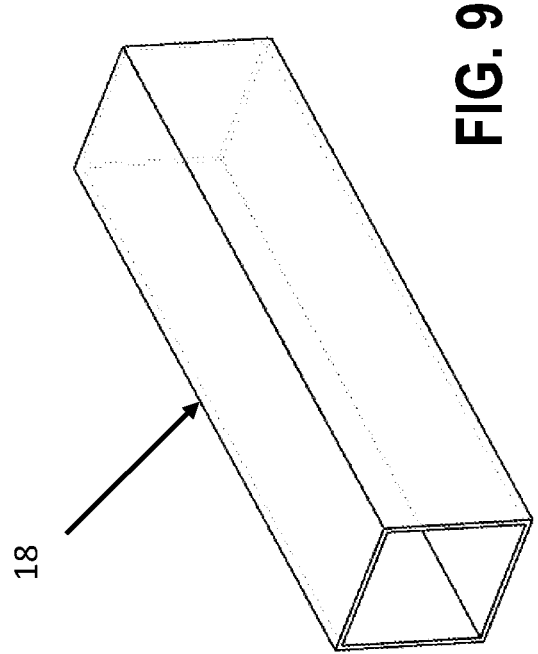
FIG. 9 is a perspective view of the bin of the storage system of FIG. 1.
Figure 10B:
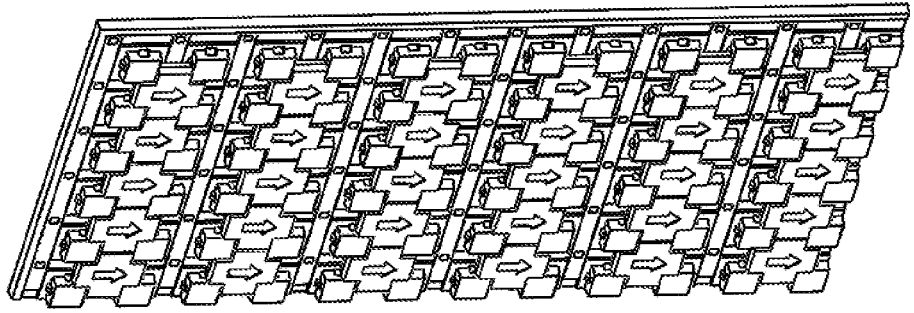
FIGS. 10A and 10B are perspective views of an exemplary storage system in accordance with an embodiment of the present invention where the gravity vector is perpendicular to the load cells and acts as a cantilever force on the load cell.
Figure 10A:
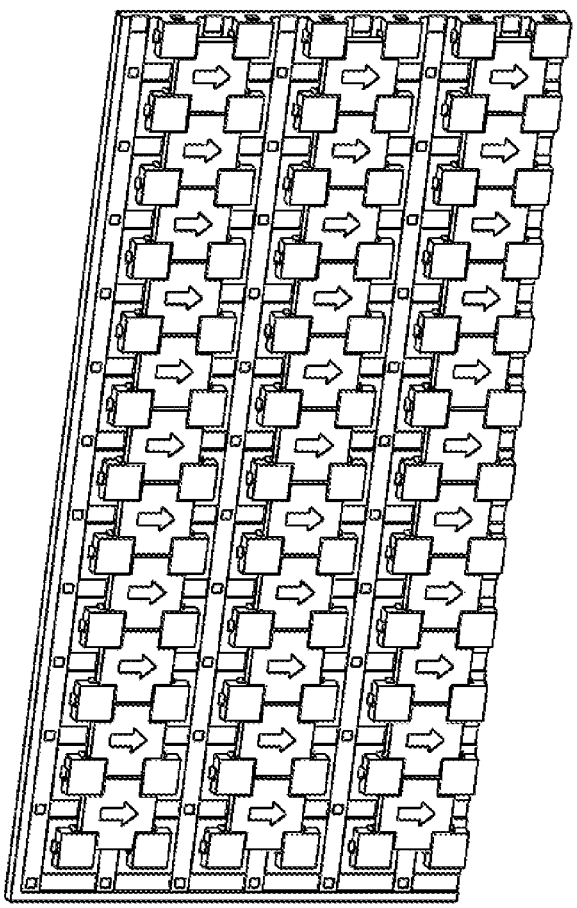
Figure 11:
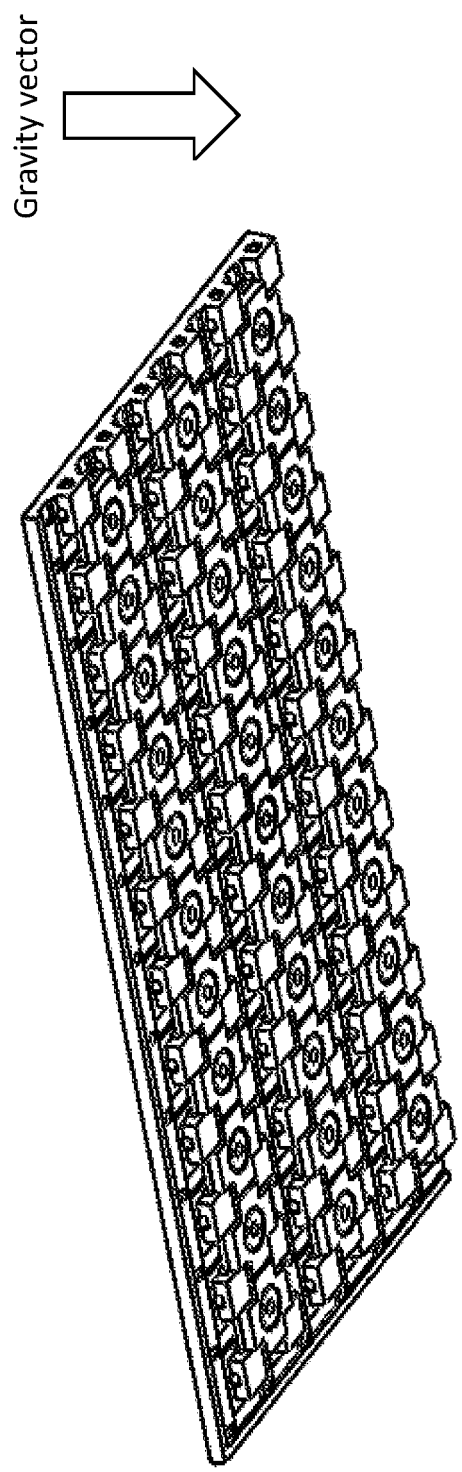
FIG. 11 is a perspective view of an exemplary storage system in accordance with an embodiment of the present invention where the gravity vector is parallel to the load cells and acts as a tension force on the load cell.
Figure 12:
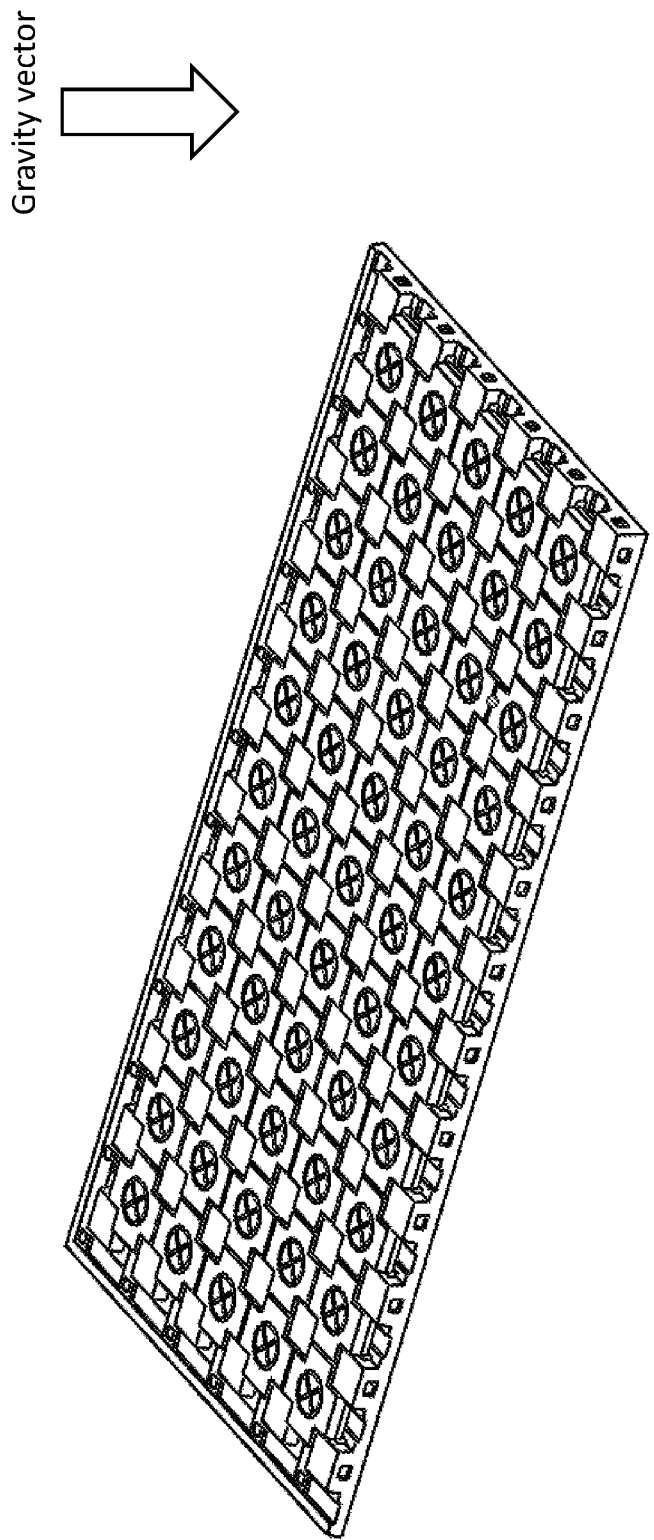
FIG. 12 is a perspective view of an exemplary storage system in accordance with an embodiment of the present invention where the gravity vector is parallel to the load cells and acts as a compression force on the load cell.

Referring to FIGS. 2 and 9, in an embodiment, each bin 18 is configured to hold at least one component, such as a medical supply (not shown) or a box of supplies (not shown). The bins 18 may vary in size and shape based on the intended application. An example application of the storage system 10 is for individually wrapped sutures (not shown). Each bin 18 may be capable of retaining any number of versions of industry standard suture boxes.

Figure 13A:
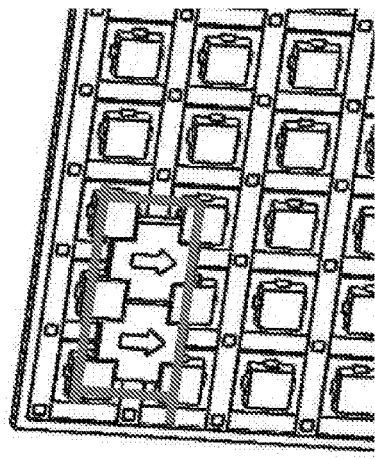
FIGS. 13A-13E depict example configurations of a bin coupled to more than one load cell in accordance with various embodiments of the present invention.
Figure 13B:
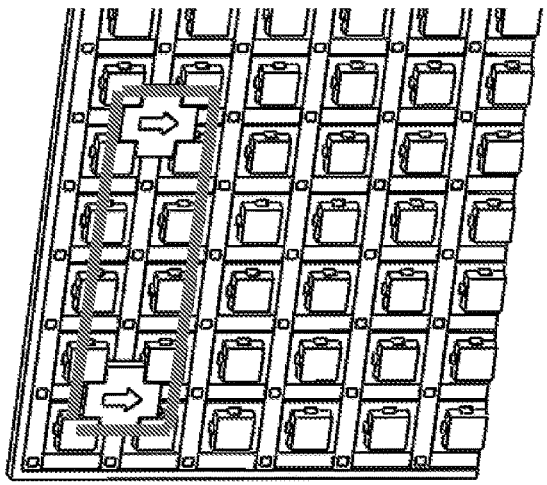
Figure 13C:
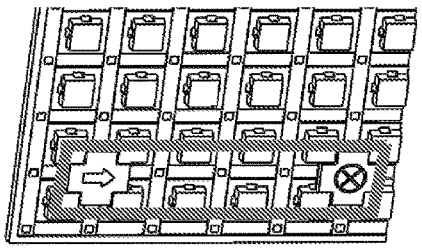
Figure 13D:
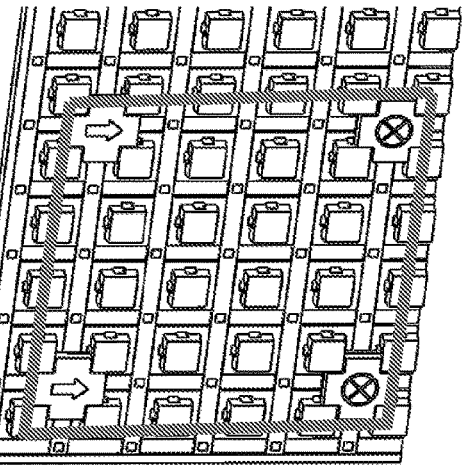
Figure 13E:
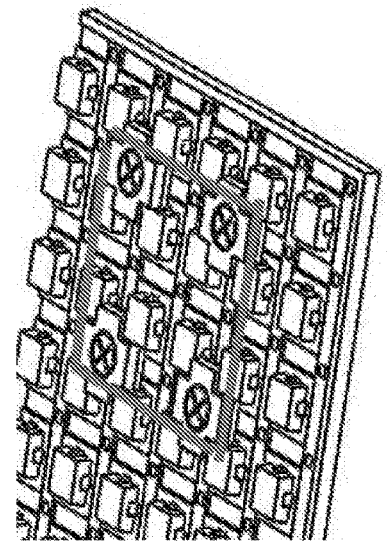

With reference to FIGS. 13A-13E, in an embodiment, more than one load cell 16 is configured to measure the weight of a single bin. Such modularity allows a single storage system 10 to be suitable for various applications regardless of changes in size or weight of the items to be placed thereon. For example, in FIG. 13A, the square around the two adjacent load cells 16 represents a rectangular bin. Similarly, FIG. 13B shows a rectangular bin coupled to two load cells 16 that are horizontally spaced apart from each other. In both FIGS. 13A and 13B, the rectangular bin extends outwardly from the carrier 12 and results in a cantilevered force on the load cells 16. FIG. 13C shows a rectangular bin coupled to two load cells 16 that are vertically spaced apart from each other. The load cell 16 at the top of the bin will experience a cantilevered force, while the load cell 16 at the bottom of the bin will experience a compression force. Similarly, in FIG. 13D, a square bin is coupled to four load cells 16: two at the top being cantilevered, and two at the bottom being compression. FIG. 13E shows a square bin coupled to four load cells 16 configured to analyze a compressive force.

The storage system 10 may include other features such as a feedback system and locks. The feedback system may include, for example, a voice activated system may be configured to provide a report on the status of the supplies (e.g., quantity on hand, location in room, etc.). The feedback system may include lights, such as LED lights, to provide visual feedback to the clinicians using it. Also, the storage system 10 may include hardware accessories. For example, locks may be included that secure the bins. As another example, the storage system 10 could have an electronic display to reflect the contents in the bins 18.

Figure 15:
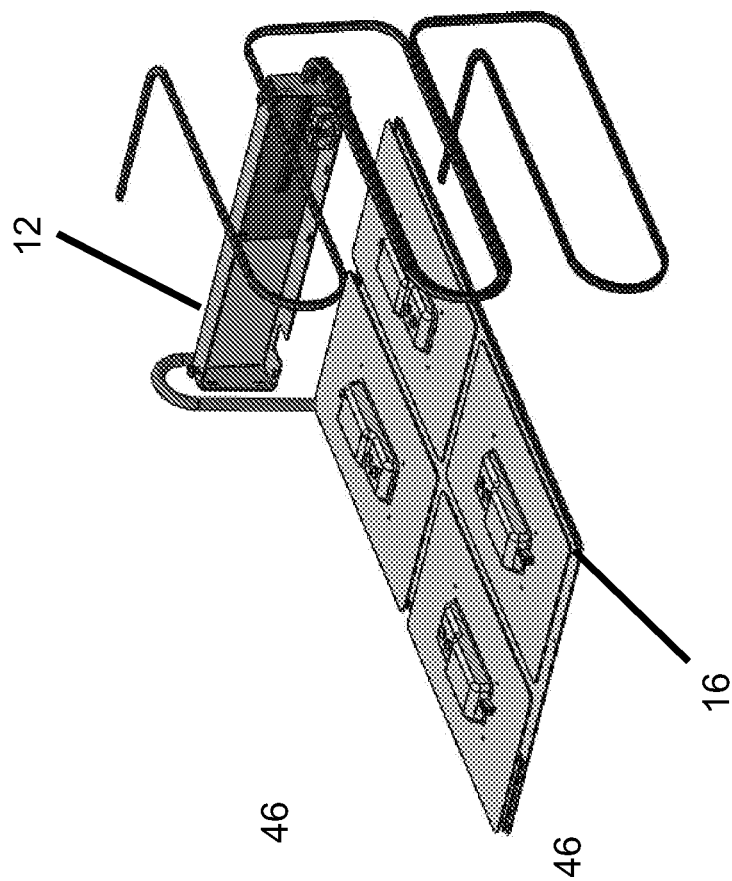
FIG. 15 is a perspective view of the carrier, bus, and load cells of the storage system of FIG. 14.
Figure 14:
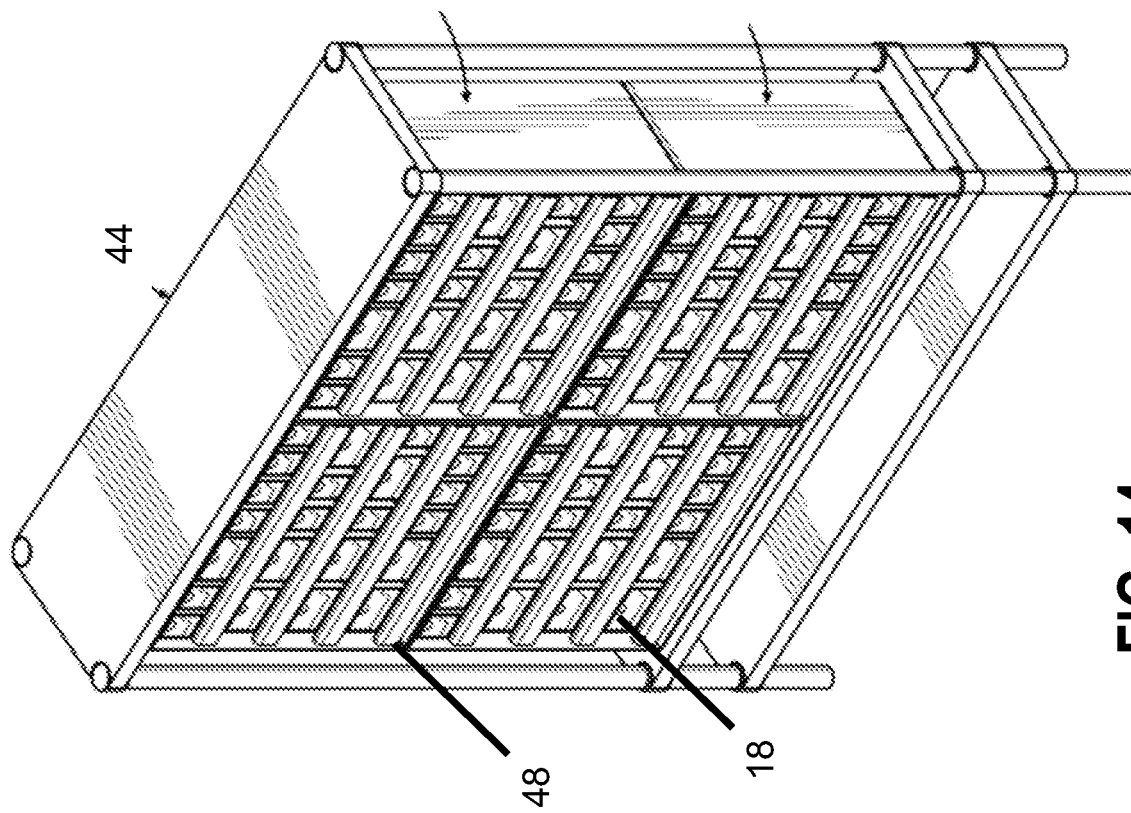
FIG. 14 is a perspective view of an exemplary storage system in accordance with an embodiment of the present invention.

With reference to FIGS. 14 and 15, in an embodiment, the exemplary storage system 10 may be configured such that the bin 18 is in the form of a basket stored in a drawer. For example, a rack 44 may include one or more cabinets 46, each including one or more drawers 48. The bins 18 may be positioned in the drawers 48. The load cells 16 can be placed under the bins 18, for example, in a bottom of the drawer 48. A drawer 48 may be configured to hold one or more bins 18. The carrier 12, which may be supporting a bus 14, can be positioned, for example, at a back of the drawer 48. The bins 18 and associated carriers 12, buses 14, and load cells 16 may be configured to fit in existing commercial drawers. In an embodiment, a drawer or cabinet may be retrofit to continuously monitor inventories of supplies according to principles discussed herein.

Figure 16:
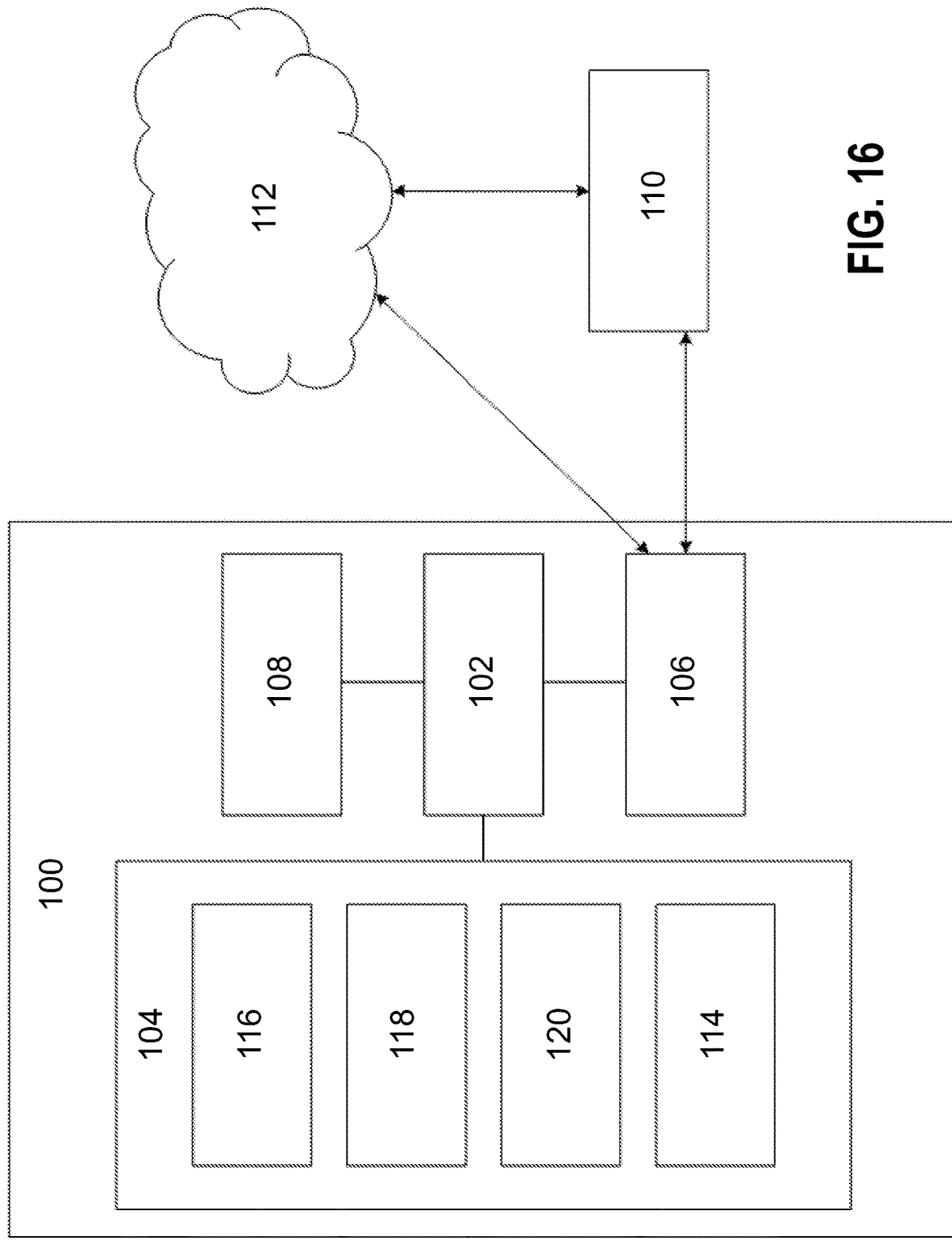
FIG. 16 is a block diagram for the relationship between the computing device, the resource, and the network through which information flows.

Referring to FIG. 16, the embodiments described above relating to the interface between each of the signal-generating load cells 16 and a receiver 42 and/or monitoring station may be implemented using one or more computer devices or systems, such as an exemplary computer system 100. A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. The computer system 100 may include a processor 102, a memory 104, a mass storage memory device, an input/output (I/O) interface 106, and a user interface 108. The computer system 100 may also be operatively coupled to one or more external resources 110 via the I/O interface 106 and/or a network 112.

The processor 102 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 104. Memory 104 may include a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing information. The mass storage memory device may include data storage devices such as a hard drive, optical drive, tape drive, non-volatile solid state device, or any other device capable of storing information. A database 114 may reside on the mass storage memory device, and may be used to collect and organize data used by the various systems and modules described herein.

The processor 102 may operate under the control of an operating system 116 that resides in memory 104. The operating system 116 may manage computer resources so that computer program code embodied as one or more computer software applications, such as application 118 residing in memory 104 may have instructions executed by the processor 102. In an alternative embodiment, the processor 102 may execute the applications directly, in which case the operating system 116 may be omitted. One or more data structures 120 may also reside in memory 104, and may be used by the processor 102, operating system 116, and/or application 118 to store or manipulate data.

The I/O interface 106 may provide a machine interface that operatively couples the processor 102 to other devices and systems, such as the network 112 and/or external resource 110. The application 118 may thereby work cooperatively with the network 112 and/or external resource 110 by communicating via the I/O interface to provide the various features, functions, and/or modules comprising embodiments of the invention. The application 118 may also have program code that is executed by one or more external resources 110, or otherwise rely on functions and/or signals provided by other system or network components external to the computer system 100. Indeed, given the nearly endless hardware and software configurations possible, persons having ordinary skill in the art will understand that embodiments of the invention may include applications that are located externally to the computer system 100, distributed among multiple computers or other external resources, or provided by computing resources (hardware and software) that are provided as a service over the network 112, such as a cloud computing service.

The user interface 108 may be operatively coupled to the processor 102 of computer system 100 in a known manner to allow a user to interact directly with the computer system 100. The user interface 108 may include video and/or alphanumeric displays, a touch screen, a speaker, and any other suitable audio and visual indicators capable of providing information to the user. The user interface 108 may also include input devices and controls such as an alphanumeric keyboard, a pointing device, keypads, pushbuttons, control knobs, microphones, etc., capable of accepting commands or input from the user and transmitting the entered input to the processor 102.

In various embodiments, artificial intelligence (AI) and machine learning (ML) algorithms are applied to predict future inventory levels based on historical data or usage patterns. Such predictive analysis allows for a proactive response (stock-out avoidance) through replenishment planning.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

Although the storage system 10 has been described herein in relation to the storage and monitoring of inventories of sutures, it will be appreciated that the storage system 10 and/or components thereof may be used to store and monitor any other type of inventory. For example, the storage system 10 may be used for storing and monitoring inventories of other supplies having generally uniform unit weights, such as intraocular implants, endomechanical devices, orthopedic devices, and non-medical supplies. The storage system 10 could be used to monitor the presence or absence of a physical product, for example to track the delivery of a package or the readiness of package to be collected, such as a laboratory sample collected in a doctor's office.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A modular inventory monitoring system comprising:
   a receiver;
   a carrier;
   buses coupled to the carrier; and
   load cells coupled to the carrier, wherein one or more of the load cells is configured to support a bin, wherein the load cells are configured to continuously measure a weight of the bin and communicate the weight or a change in the weight to the receiver, and wherein the carrier includes a support surface and stanchions integrally coupled to the support surface, wherein channels extend between the stanchions, each of the channels configured to receive a respective one of the buses.

2. The system of claim 1, wherein the stanchions are arranged in a grid-like pattern.

3. The system of claim 2, wherein each of the load cells fit between the stanchions.

4. The system of claim 1, wherein each of the load cells are configured to analyze a type of force, wherein the type of force is based at least in part on a size of a respective bin coupled to each of the load cells.

5. The system of claim 1, wherein the load cells each include a load icon indicating a type of force a respective load cell is configured to measure.

6. The system of claim 1, wherein two adjacent load cells are configured to measure a same type of force, and a first bin is coupled to the two adjacent load cells.

7. The system of claim 1, wherein two spaced apart load cells are configured to measure a same type of force, and a first bin is coupled to the two spaced apart load cells.

8. The system of claim 1, wherein two spaced apart load cells are configured to measure a different type of force, and a first bin is coupled to the two spaced apart load cells.

9. The system of claim 1, wherein a first set of spaced apart load cells are configured to measure a first type of force, a second set of spaced apart load cells are configured to measure a second same of force, the first type of force being different from the second type of force, and wherein a first bin is coupled to the first set of spaced apart load cells and the second set of spaced apart load cells.

10. The system of claim 1, further comprising bins, each of the bins being configured to contain a component.

11. The system of claim 1, wherein the receiver is configured to collect and store data relating to an inventory condition of the respective bin.

12. The system of claim 1, wherein the receiver is configured to continuously display a current inventory quantity at a monitoring station.

13. The system of claim 1, further comprising a cabinet comprising a drawer having a bottom and a back wall, wherein the load cells are positioned in the bottom of the drawer and the carrier is coupled to the back wall of the drawer.

14. A retrofit cabinet comprising the system of claim 1, wherein a cabinet is retrofit to be coupled to the carrier.

15. A kit comprising:
   the system of claim 1;
   a first bin having a first size; and
   a second bin having a second size, the first size being different from the second size,
   wherein the load cells are rearrangeable.

16. The kit of claim 15, wherein the load cells comprise a first load cell configured to measure a first type of force and a second load cell configured to measure a second type of force, the first type of force being different from the second type of force.

17. A method of using the system of claim 1, the method comprising:
   determining a first configuration of load cells based on a size of bins intended to be coupled to the load cells;
   determining a type of force that a respective load cell is configured to measure based at least in part on a size of the respective bin coupled to the respective load cell; and
arranging the load cells in the first configuration.

18. The method of claim 17, further comprising coupling bins to the load cells and continuously monitoring an inventory of the bins.

19. The method of claim 17, further comprising rearranging the load cells to be in a second configuration.

* * * * *